(12) United States Patent
Kim et al.

(10) Patent No.: US 8,872,816 B2
(45) Date of Patent: Oct. 28, 2014

(54) THREE-DIMENSIONAL IMAGE DISPLAY DEVICE AND DRIVING METHOD THEREOF

(75) Inventors: Seong Il Kim, Asan-si (KR); Bae Won Lee, Yongin-si (KR); San Seong Seomun, Seongnam-si (KR); Ja Hun Koo, Asan-si (KR); Woon-Rok Jang, Cheonan-si (KR); Su-Han Woo, Asan-si (KR)

(73) Assignee: Samsung Display Co., Ltd. (KR)

( * ) Notice: Subject to any disclaimer, the term of this patent is extended or adjusted under 35 U.S.C. 154(b) by 279 days.

(21) Appl. No.: 13/425,873

(22) Filed: Mar. 21, 2012

(65) Prior Publication Data

US 2013/0106836 A1    May 2, 2013

(30) Foreign Application Priority Data

Nov. 2, 2011    (KR) .................. 10-2011-0113388

(51) Int. Cl.
  *G06T 15/00*    (2011.01)
  *H04N 13/04*    (2006.01)
  *G09G 3/34*    (2006.01)
  *G09G 3/00*    (2006.01)

(52) U.S. Cl.
  CPC ............. *G09G 3/34* (2013.01); *H04N 13/0434* (2013.01); *G09G 3/003* (2013.01); *H04N 13/0438* (2013.01); *G09G 2310/08* (2013.01); *G09G 2310/0237* (2013.01); *G09G 2320/0209* (2013.01)
  USPC ............................................. 345/419; 348/56

(58) Field of Classification Search
  CPC ............ G09G 5/18; G09G 2320/0209; H04N 13/0438
  USPC .............................. 345/419, 690–691; 348/56
  See application file for complete search history.

(56) References Cited

U.S. PATENT DOCUMENTS

| | | | |
|---|---|---|---|
| 2010/0066820 A1 | 3/2010 | Park et al. | |
| 2011/0018983 A1 | 1/2011 | Kim et al. | |
| 2011/0057965 A1 | 3/2011 | Park et al. | |
| 2012/0019637 A1* | 1/2012 | Ko et al. .......................... | 348/56 |
| 2012/0038690 A1* | 2/2012 | Lee ................................ | 345/691 |

FOREIGN PATENT DOCUMENTS

| | | |
|---|---|---|
| JP | 9138384 | 5/1997 |
| JP | 2009031523 | 2/2009 |
| JP | 2009152897 | 7/2009 |
| KR | 100273188 | 9/2000 |
| KR | 1020020050042 | 6/2002 |
| KR | 100406217 | 11/2003 |
| KR | 100577761 | 5/2006 |
| KR | 1020100032284 | 3/2010 |
| KR | 1020110009504 | 1/2011 |
| KR | 1020110025627 | 3/2011 |

* cited by examiner

*Primary Examiner* — Xiao Wu
*Assistant Examiner* — Charles Tseng
(74) *Attorney, Agent, or Firm* — Cantor Colburn LLP

(57) ABSTRACT

A three-dimensional image display device includes: a display panel assembly including a display panel including pixels which alternately displays first and second images, and a data driver which transmits data voltages to the pixels; a backlight unit which provides light to the display panel assembly; and a shutter member including first and second shutters, where the backlight unit emits the light during light emitting periods, the light emitting periods includes first light emitting periods, during which the first image is displayed, and second light emitting periods, during which the second image is displayed, the first light emitting periods and the second light emitting periods alternate, and the first shutter is opened during at least two open periods, which are between neighboring second light emitting periods of the second light emitting periods and temporally spaced apart from each other.

13 Claims, 7 Drawing Sheets

THREE-DIMENSIONAL IMAGE DISPLAY DEVICE AND DRIVING METHOD THEREOF

This application claims priority to Korean Patent Application No. 10-2011-0113388 filed on Nov. 2, 2011, and all the benefits accruing therefrom under U.S.C. §119, the content of which in its entirety is herein incorporated by reference.

BACKGROUND OF THE INVENTION (a) Field of the Invention

Exemplary embodiments of the invention relate to a three-dimensional ("3D") image display device and a driving method thereof, and more particular, to a 3D image display device including shutter glasses and a driving method thereof.

(b) Description of the Related Art

In recent years, 3D stereoscopic image display devices have developed, and various 3D image display methods have been researched.

In 3D image display technology, stereoscopic perception of an object is typically represented using binocular parallax, which is the main factor for recognizing stereoscopic perception at a close distance. That is, when different two-dimensional ("2D") images are transmitted to a left eye and a right eye of an observer, respectively, and the image projected onto the left eye (hereinafter referred to as a "left eye image") and the image projected onto the right eye (hereinafter referred to as a "right eye image") are transferred to the brain of the observer, the left eye image and the right eye image are combined in the brain such that the different 3D images are recognized as a 3D image with depth perception. A 3D image display device based on the binocular parallax typically uses a stereoscopic method using glasses such as shutter glasses, polarized glasses, or the like, and an autostereoscopic method, in which lenticular lens and a parallax barrier or the like are disposed in a display device without using glasses.

In the shutter glasses type, the left eye image and the right eye image are alternately and continuously outputted from the 3D image display device, and a left eye shutter and a right eye shutter of the shutter glasses are selectively opened and closed by control of a shutter controller, thereby expressing the 3D image. When each of the left eye shutter and the right eye shutter of the shutter glasses is repeatedly in an open state and in a closed state such that a display image and an edge image, which are recognized through the shutter glasses, may be seen to be flickering when the operation frequency thereof is substantially less than a critical fusion frequency. Here, the critical fusion frequency may be defined as a minimum frequency that light of a uniform luminance is recognized by a viewer without recognition of the flickering when displaying two lights having different luminance.

BRIEF SUMMARY OF THE INVENTION

The invention reduces flickering of an image recognized through shutter glasses in a three-dimensional ("3D") image display device using the shutter glasses, and tiredness of eyes of an observer.

In an exemplary embodiment, a 3D image display device includes: a display panel assembly including a display panel which includes a plurality of pixels which alternately displays a first image and a second image, and a data driver which transmits data voltages to the plurality of pixels; a backlight unit which provides light to the display panel assembly; and a shutter member including a first shutter and a second shutter, where the backlight unit emits the light during a plurality of light emitting periods, where the plurality of light emitting periods includes a plurality of first light emitting periods, during which the first image is displayed, and a plurality of second light emitting periods, during which the second image is displayed, where the plurality of first light emitting periods and the plurality of second light emitting periods alternate, and where the first shutter is opened during at least two open periods, which are between neighboring second light emitting periods of the plurality of second light emitting periods and temporally spaced apart from each other.

According to another exemplary embodiment of a driving method of a 3D image display device, including a display panel assembly including a display panel which includes a plurality of pixels which alternately displays a first image and a second image, and a data driver which transmits data voltages to the plurality of pixels, a backlight unit which provides light to the display panel assembly, and a shutter member including a first shutter and a second shutter, the method includes: applying a first data voltage for the first image to the plurality of pixels; applying a second data voltage for the second image to the plurality of pixels; emitting light during a plurality of first light emitting periods, during which the first image is displayed, from the backlight unit; emitting light during a plurality of second light emitting periods, during which the second image is displayed, from the backlight unit; and opening the first shutter during at least two open periods, which are between neighboring second light emitting periods and temporally spaced apart from each other.

In an exemplary embodiment, the at least two open period may include a primary open period overlapping at least a portion of the first light emitting period, and a first additional open period between the first light emitting period and the second light emitting period neighboring each other.

In an exemplary embodiment, the data voltage may include a first data voltage for the first image and a second data voltage for the second image, a vertical blank period may be between an input period of the first data voltage and an input period of the second data voltage, and the vertical blank period may overlap one of plurality of first light emitting periods and the plurality of second light emitting periods.

In an exemplary embodiment, the second shutter may be closed during the first light emitting period, and the first shutter may be closed during the second light emitting period.

In an exemplary embodiment, the second shutter may be opened during at least two open periods, which are between neighboring first light emitting periods and temporally spaced apart from each other, and the at least two open periods of the first shutter and the at least two open periods of the second shutter may not overlap each other.

In an exemplary embodiment, an operation frequency of at least one of the first shutter and the second shutter may be greater than or equal to about 75 hertz (Hz).

Another exemplary embodiment of a 3D image display device includes: a display panel assembly including a display panel including a plurality of pixels which alternately displays a first image and a second image; a backlight unit which provides light to the display panel assembly; and a shutter member including a first shutter and a second shutter, where an operation frequency of at least one of the first shutter and the second shutter is greater than or equal to about 75 Hz.

According to exemplary embodiments of a 3D image display device using shutter glasses, flickering of an image recognized by a viewer through the shutter glasses is effectively prevented and fatigue of eyes of the viewer is thereby substantially reduced.

BRIEF DESCRIPTION OF THE DRAWINGS

The above and other features will become more apparent by describing in further detail exemplary embodiments thereof with reference to the accompanying drawings, in which.

DETAILED DESCRIPTION OF THE EMBODIMENTS

Figure 1:
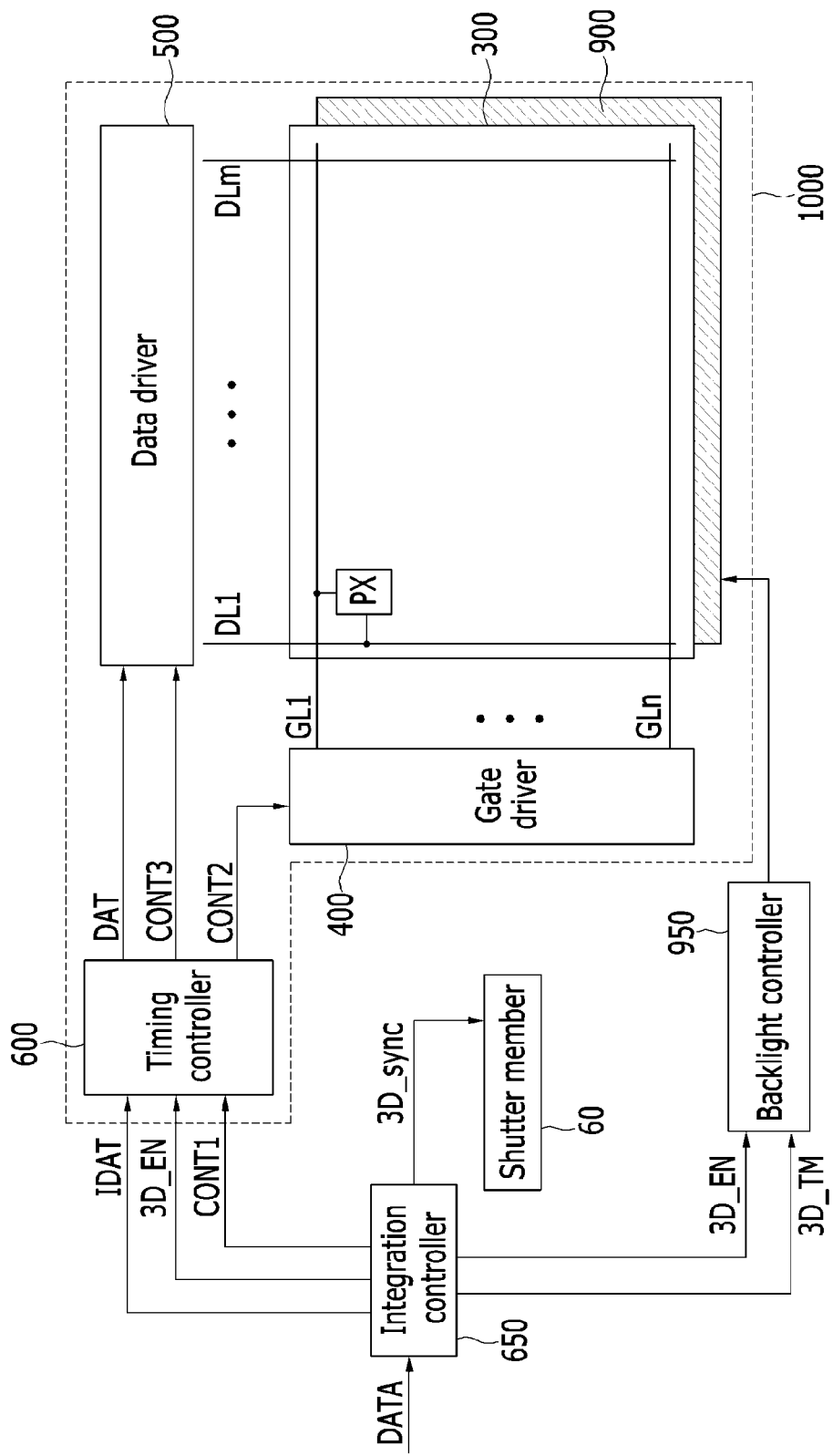
FIG. 1 is a block diagram showing an exemplary embodiment of a three-dimensional ("3D") image display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a three-dimensional ("3D") image display device according to the invention will be described with reference to the accompanying drawings.

Firstly, an exemplary embodiment of a 3D image display device according to the invention will be described with reference to FIGS. 1 and 2.

Figure 2:
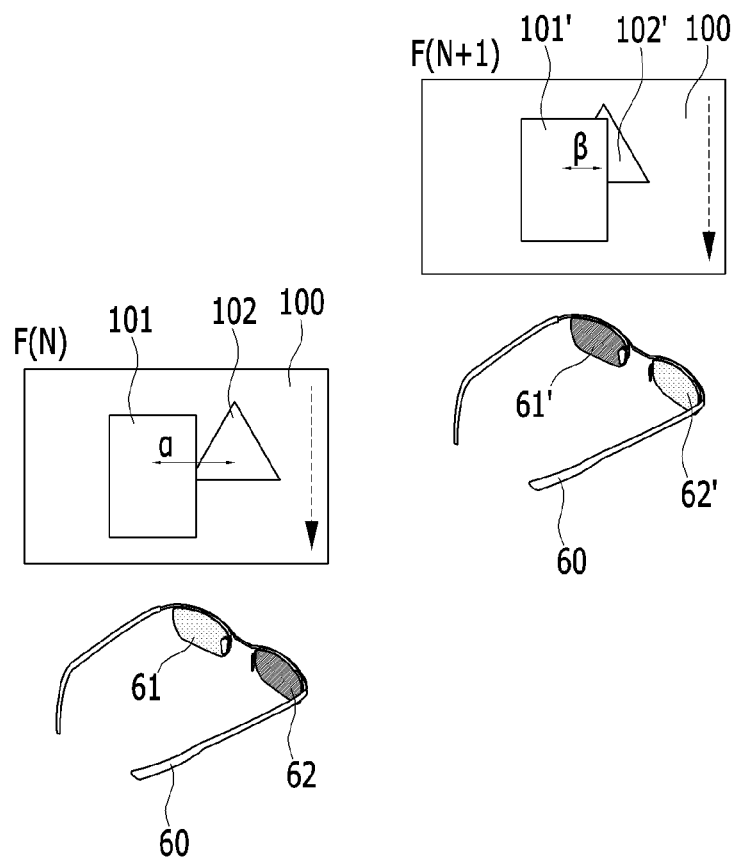
FIG. 2 is a perspective view of an exemplary embodiment of a 3 D image display device according to the invention, showing an operation thereof.

FIG. 1 is a block diagram showing an exemplary embodiment of a 3D image display device according to the invention, and FIG. 2 is a perspective view of an exemplary embodiment of a 3D image display device according to the invention, showing an operation thereof.

Referring to FIG. 1, a 3D image display device includes an integration controller 650, a display panel assembly 1000, a backlight controller 950 and a shutter member 60.

In an exemplary embodiment, the integration controller 650 receives image information DATA from an outside thereof to generate an input image signal IDAT, a 3D enable signal 3D_EN, a 3D timing signal 3D_TM, a 3D synchronization signal 3D_sync and an input control signal CONT1 for controlling display of the input image signal IDAT. The integration controller 650 may transmit the input image signal IDAT, the 3D enable signal 3D_EN and the input control signal CONT1 to the timing controller 600 of the display panel assembly 1000, transmit the 3D enable signal 3D_EN and the 3D timing signal 3D_TM to the backlight controller 950, and transmit the 3D synchronization signal 3D_sync to the shutter member 60.

The input image signal IDAT includes luminance information. In an exemplary embodiment, the luminance information is corresponding to a predetermined number of gray levels, for example, $1024=2^{10}$, $256=2^8$, or $64=2^6$. The 3D enable signal 3D_EN instructs an operation in a 3D mode for the 3D image display device, and the 3D timing signal 3D_TM may include timing information of driving signals in the 3D mode. The 3D synchronization signal 3D_sync is a signal which controls on and off timing of the shutter included in the shutter member 60 in the 3D mode. The input control signal CONT1 may include a vertical synchronization signal Vsync, a horizontal synchronizing signal Hsync, a main clock signal MCLK and a data enable signal DE, for example.

The display panel assembly 1000 may be one of a plasma display panel ("PDP"), a liquid crystal display and an organic light emitting display device, for example, but not being limited thereto.

An exemplary embodiment of the display panel assembly 1000 according to the invention includes a display panel 300 displaying images, a gate and data drivers 400 and 500 connected to the display panel 300, a timing controller 600 that controls the gate and data drivers 400 and 500, and a backlight unit 900 that provides light toward the display panel 300.

In an exemplary embodiment, the display panel 300 includes a plurality of display signal lines, and a plurality of pixels PX connected to the display signal lines. The pixels PX may be arranged substantially in a matrix form. The display signal lines include a plurality of gate lines GL1 to GLn that transmits gate signals (also referred to as "scanning signals") and a plurality of data lines DL1 to DLm that transmits data signals. Each of the pixels PX may include a switching element (not shown) such as a thin film transistor connected to a corresponding gate line of the gate lines GL1 to GLn and a corresponding data line of the data lines DL1 to DLm, and a pixel electrode (not shown) connected to the corresponding gate line and the corresponding data line.

The timing controller 600 controls the operation of the gate driver 400 and the data driver 500. The timing controller 600 may operate in the 2D mode or the 3D mode based on the 3D enable signal 3D_EN input from the integration controller 650. The timing controller 600 processes the input image signals IDAT to be corresponding to the operating conditions of the display panel 300 based on the input image signal IDAT and the input control signal CONT1. The timing controller 600 generates a gate control signal CONT2 and a data control signal CONT3, outputs the gate control signal CONT2 to the gate driver 400, and outputs the data control signal CONT3 and the processed image signal DAT to the data driver 500.

The data driver 500 is connected to the data lines DL1 to DLm of the display panel 300. In an exemplary embodiment, the data driver 500 divides a gray reference voltage transmitted from a gray voltage generator (not shown) to generate a gray voltage corresponding to a gray level. In an alternative exemplary embodiment, the data driver 500 may receive a plurality of gray voltages from outside. The data driver 500 receives the processed image signal DAT, e.g., a digital image data, for the pixels PX in a pixel row based on the data control signal CONT3, and selects the gray voltage corresponding to processed image signal DAT from the gray voltages to convert the processed image signal DAT into a data voltage and transmit the data voltage Vd to the corresponding data lines DL1 to DLm. In an exemplary embodiment, the data voltage may include a left eye data voltage and a right eye data voltage in the 3D mode.

The gate driver 400 is connected to the gate lines GL1 to GLn, and applies the gate signals having levels corresponding to a gate-on voltage and a gate-off voltage to the gate lines GL1 to GLn. The gate driver 400 applies the gate-on voltage to the gate lines GL1 to GLn based on the gate control signal CONT2 from the timing controller 600 to turn on the switching element of a corresponding pixel PX connected to the gate lines GL1 to GLn. When the switching element is turned on, the data voltage applied to the data lines DL1 to DLm may be applied to the corresponding pixel PX through the turned-on switching element.

The backlight unit 900 includes a light source. In an exemplary embodiment the backlight unit 900 may be disposed substantially close to the display panel 300, e.g., positioned at the back side of the display panel 300. In an exemplary embodiment, the light source may be a fluorescent lamp such as a cold cathode fluorescent lamp ("CCFL"), or a light emitting diode ("LED"), for example.

The display panel assembly 1000 sequentially applies the gate-on voltage to all of the gate lines GL1 to GLn during a unit of 1 horizontal period (referred to as "1 H", equal to one cycle of the horizontal synchronizing signal Hsync and the data enable signal DE) and applies the data voltage to all of the pixels PX, such that an image of a unit frame is displayed. In an exemplary embodiment, when the 3D image display device is in the 3D mode, the left eye data voltage or the right eye data voltage is applied to all of the pixels PX during the unit frame. In an exemplary embodiment, a vertical blank period may be inserted between a frame during which the left eye data voltage is applied and a frame during which the right eye data voltage is applied. In an exemplary embodiment, a time duration of the vertical blank period may be substantially the same as the same as the time duration of the unit frame during which the left eye data voltage or the right eye data voltage is applied. The vertical blank period will be described later in greater detail.

In an exemplary embodiment, the backlight controller 950 receives the 3D timing signal 3D_TM and the 3D enable signal 3D_EN from the integration controller 650, generates the backlight control signal based on the 3D timing signal 3D_TM and the 3D enable signal 3D_EN, and transmits the backlight control signal to the backlight unit 900. In an alternative exemplary embodiment, the backlight controller 950 may receive the backlight control signal from the timing controller 600. The backlight unit 900 may be turned on or turned off during a predetermined time based on the backlight control signal.

In an exemplary embodiment, the shutter member 60 receives the 3D synchronization signal 3D_sync, which is a signal including information on shut-off timing and a time duration for maintaining shut-off status of a shutter thereof, from the integration controller 650, to control shut-off of the shutter. In an alternative exemplary embodiment, the 3D synchronization signal 3D_sync may be generated in the timing controller 600 and transmitted to the shutter member 60. In an exemplary embodiment, the shutter member 60 may be synchronized with the display panel assembly 1000 such that a user may recognize the image displayed by the display panel assembly 1000 as a 3D image through the shut-off of the shutter of the shutter member 60.

In an exemplary embodiment, the shutter member 60a may be shutter glasses including a left eye shutter 61 and 61' and a right eye shutter 62 and 62', as shown in FIG. 2. In an exemplary embodiment, the shutter member 60 may include mechanical shutter glasses (e.g., goggles), optical shutter glasses, a head mounted unit, or shutter glasses including shutters using a microelectromechanical system ("MEMS"), for example, but not being limited thereto.

Hereinafter, an operation of an exemplary embodiment of the 3D image display device will be described with reference to FIGS. 1 and 2.

Referring to FIG. 2, the direction of the arrows shown in the display panel assembly 1000 represents a sequence in which the gate-on voltage is applied to the gate lines GL1 to GLn extending substantially in a row direction on a display assembly 100. In such an embodiment, the gate-on voltage may be sequentially applied from a first gate line GL1 to an n-th gate line GLn of the display panel assembly 100.

In an exemplary embodiment, the shutter member 60 is the shutter glasses including the left eye shutters 61 and 61' and the right eye shutters 62 or 62'. In such an embodiment, when the display panel assembly 100 alternately displays left eye images 101 and 102 and right eye images 101' and 102', the right eye shutter 62 and 62' and the left eye shutter 61 and 61' of the shutter member 60 are synchronized with the display panel assembly 100, such that the shutter member 60 alternately blocks the light from the display panel assembly 100. The left eye shutter 61 and 61' may be in an open state 61 or in a closed state 61', and the right eye shutter 62 and 62' may be in a closed state 62 or in an open state 62'. In an exemplary embodiment, in the 3D mode, the left eye shutter may be in the closed state 61' during a time that the right eye shutter is in the open state 62', and the right eye shutter may be in the closed state 62 during a time that the left eye shutter is in the open state 61. In an exemplary embodiment, both of the left eye shutter and the right eye shutter may be in the open state or the closed state in another display mode.

When the left eye images 101 and 102 are displayed on the display panel assembly 100, the left eye shutter 61 of the shutter member 60 is in the open state such that the light is transmitted therethrough, and the right eye shutter 62 is in the closed state such that the light is blocked thereby. When the right eye images 101' and 102' are output to the display panel assembly 100, the right eye shutter 62' of the shutter member 60 is in the open state such that the light is transmitted therethrough, and the left eye shutter 61' is in the closed state such that the light is blocked thereby. In such an embodiment, the left eye images may be recognized only by the left eye during a predetermined time, and then the right eye images may be recognized only by the right eye during a predetermined time, as shown in FIG. 2. Accordingly, a 3D image with depth perception may be recognized by the difference between the left eye image and the right eye image.

In an exemplary embodiment, the image recognized by the left eye as the image of the N-th frame F(N) may be the images in which a left eye image 101 of a quadrangle and a left eye image 102 of a triangle are separated by a distance α. In such an embodiment, the image recognized by the right eye as the image of the (N+1)-th frame F(N+1) may be the image in which a right eye image 101' of a quadrangle and a right eye image 102' of a triangle are separated by a distance β. Here, α and β may be different from each other. In such an embodiment, when the distance between the images recognized by two eyes is different, it may be recognized that the triangle is separated behind the quadrangle such that the depth perception may be perceived by a viewer. In an exemplary embodiment, the distance (depth perception) between two objects spaced apart from each other may be differently perceived by the viewer by adjusting the distances α and β between the quadrangles and the triangles, which are spaced apart from each other, in the left eye image and the right eye image.

Next, a driving method of the 3D image display device will be described with reference to FIG. 3 together with FIGS. 1 and 2.

Figure 3:
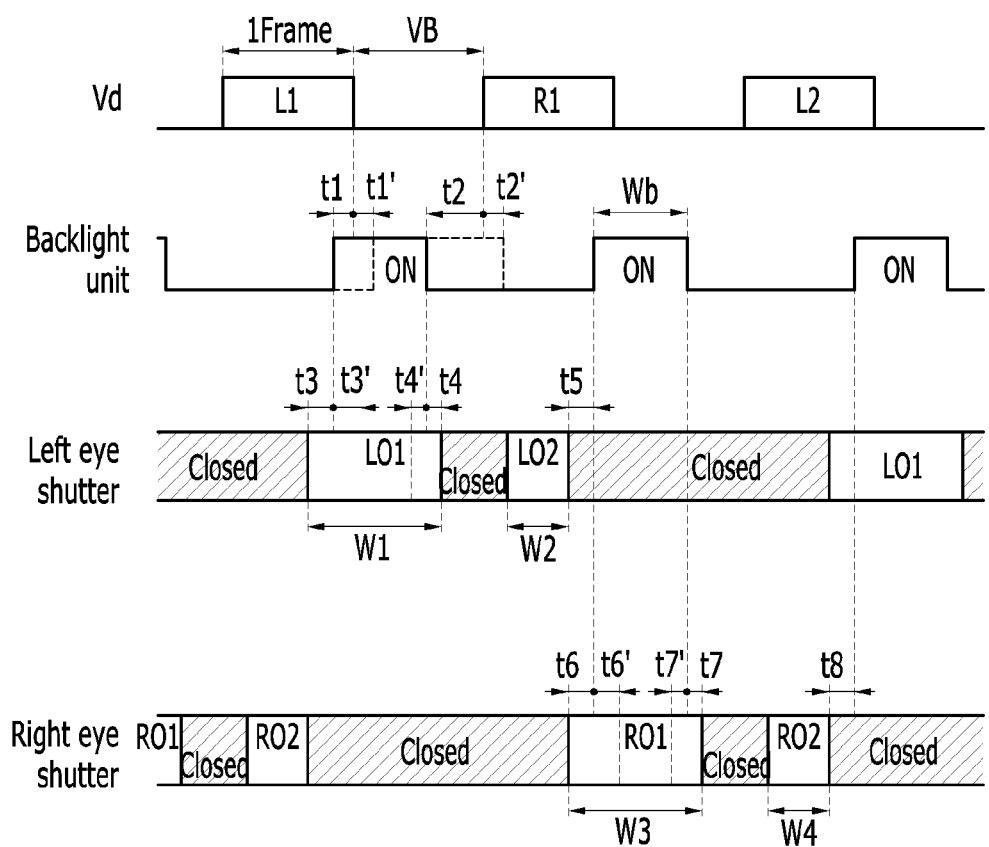
FIGS. 3 to 7 are signal timing diagrams showing signals of exemplary embodiments of a driving method of a 3D image display device according to the invention.

FIG. 3 is a timing diagram showing signals of an exemplary embodiment of a driving method of a 3D image display device according to the invention.

In an exemplary embodiment, when the gate driver 400 sequentially applies the gate-on voltage to the gate lines GL1 to GLn and the data driver 500 applies the data voltage Vd to the data lines DL1 to DLm, the data voltage Vd is applied to a corresponding pixel PX of the display panel 300 such that an image of a gray corresponding to the data voltage Vd is displayed. The data voltage Vd may include a right eye data voltage R1 and left eye data voltages L1 and L2, and each of the right eye data voltage R1 and the left eye data voltages L1 and L2 may be input to all of the pixels PX during a unit frame. The right eye data voltage R1 and the left eye data voltage L1 or L2 may be alternately input to all of the pixels PX.

A vertical blank period VB occurs between an input period of the right eye data voltage R1 and an input period of the left eye data voltages L1 and L2. In an exemplary embodiment, the data voltage Vd may not be input during the vertical blank period VB. In an alternative exemplary embodiment, one of the left eye data voltages L1 and L2 or the right eye data voltage R1 of a previous frame may be input during the vertical blank period VB. In an exemplary embodiment, the vertical blank period VB may be substantially equal to the unit frame. In an exemplary embodiment, four consecutive frames corresponding to two neighboring input periods of the data voltage Vd, e.g., the right eye data voltage R1 and one of the left eye data voltages L1 and L2, and two vertical blank periods VB immediately after the two neighboring input periods of the data voltage Vd, respectively, may define a unit frame set. In such an embodiment, when each vertical blank period VB is maintained during one frame, the unit frame set may include four frames. In an alternative exemplary embodiment, the vertical blank period VB may be maintained during a time period less than one frame. In another alternative exemplary embodiment, the data voltage Vd may not include the vertical blank period VB, e.g., the vertical blank period VB may be about zero (0).

The backlight unit 900 may emit light during a plurality of light emitting periods ON based on the backlight control signal. During each of the light emitting periods ON of the backlight unit 900, the display panel 300 may display one of the right eye image and the left eye image, which is corresponding to the right eye data voltage R1 and the left eye data voltage L1 or L2, respectively, and input to the pixels PX during a frame directly before each of the light emitting periods ON.

In an exemplary embodiment, each of the light emitting periods ON of the backlight unit 900 may temporally overlap at least a portion of the vertical blank period VB, and may partially overlap the input period of the data voltage L1, L2 and R1 of the frame directly before the corresponding vertical blank period VB. In such an embodiment, during the light emitting periods ON of the backlight unit 900, light is emitted in a state where one of the left eye data voltage L1 are L2 and the right eye data voltage R1 is input to at least one of the pixels PX such that an image is displayed.

In an exemplary embodiment, each of the light emitting periods ON may begin a first time t1 before an end point of a corresponding data voltage input period, e.g., a period of one of the left eye data voltage L1 or L2 and the right eye data voltage R1. In an alternative exemplary embodiment, each of the light emitting periods ON may begin the first time t1' after the end point of the corresponding data voltage input period. In an exemplary embodiment, each of the light emitting periods ON may end a second time t2 before a start point of the data voltage input period after a corresponding vertical blank period VB. In an alternative exemplary embodiment, each of the light emitting periods ON may end the second time t2' after the start point of the data voltage input period after the corresponding vertical blank period VB. In such an embodiment, where an image display response speed of the display panel 300 is substantially slow, each of the light emitting periods ON begins the first time t1' after the end point of the corresponding data voltage input period such that crosstalk, due to displaying both of the left eye image and the right eye image during a same time period, is effectively prevented or substantially reduced. In an exemplary embodiment, when the data voltage Vd is input to the display panel 300, a corresponding image may be displayed with delay due to the display response speed. Accordingly, the crosstalk may not occur when the light emitting periods ON is maintained until the second time t2' after the start of the data voltage input period of a next frame. The first time (t1, t1') and the second time (t2, t2') may be predetermined based on the display response speed of the display panel 300. In an exemplary embodiment, at least one of the first time (t1, t1') and the second time (t2, t2') may be about zero (0).

In an exemplary embodiment, a time difference between the starting points of neighboring light emitting periods ON may be in a range from about 5 milliseconds (ms) to about 10 milliseconds (ms), and a width Wb (e.g., a time duration) of each of the light emitting periods ON may be in a range from about 1 ms to 3 ms. The time difference between the starting points of the neighboring light emitting periods ON and the width Wb of each of the light emitting periods ON may be predetermined based on conditions of the display device. In an exemplary embodiment, the unit frame set including the input period of one left eye data voltage and the input period of one right eye data voltage may include at least two light emitting periods ON that are separated from each other. In an alternative exemplary embodiment, the backlight unit 900 may be continuously turned on during the unit frame set such that the left eye image or the right eye image may be separately shown by controlling the shutoff time of the left eye shutter and the right eye shutter of the shutter member 60.

In an exemplary embodiment, an open period of the left eye shutter of the shutter member 60 in a frame set includes a primary open period LO1 and at least one additional open period LO2 neighboring thereto. In the primary open period LO1 in the frame set, the left eye shutter may be opened during at least a portion of a light emitting period ON of the backlight unit 900 corresponding to a left eye image in the frame set. A closed period of the left eye shutter occurs between the primary open period LO1 of the left eye shutter and the additional open period LO2 of the left eye shutter neighboring thereto. In such an embodiment, at least two open periods, e.g., the primary open period LO1 and the at least one additional open period LO2 of the left eye shutter, may occur between the at least two neighboring light emitting periods in the frame set to display the left eye image.

In an exemplary embodiment, the primary open period LO1 of the left eye shutter may begin a third time t3 before a start point of a corresponding light emitting period ON of the at least two neighboring light emitting periods in the frame set. In an alternative exemplary embodiment, the primary open period LO1 of the left eye shutter may begin the third time t3' after the start point of the corresponding light emitting period ON. In an exemplary embodiment, the primary open period LO1 of the left eye shutter may end a fourth time t4 after an end point of the corresponding light emitting period ON. In an alternative exemplary embodiment, the primary open period LO1 of the left eye shutter may end the fourth time t4' before the end point of the corresponding light emitting period ON. The third time t3 may have predetermined time duration such that a right eye image in a previous frame set is not shown while the image of the display panel 300 is shown through the left eye shutter with increased luminance. The primary open period LO1 of the left eye shutter, which is corresponding to the left eye image of the frame set, may not overlap the light emitting period ON corresponding to the right eye image in the frame set. In an exemplary embodiment, the left eye image displayed during the corresponding light emitting period ON may be shown to the viewer through the left eye shutter that is opened during the primary open period LO1 of the left eye shutter. In such an embodiment, the right eye shutter may be closed during the primary open period LO1 of the left eye shutter.

The additional open period LO2 of the left eye shutter in the frame set may occur between the primary open period LO1 of the left eye shutter in the frame set and a light emitting period ON neighboring the light emitting period ON of the backlight unit 900 corresponding to the primary open period LO1 of the left eye shutter, that is, the light emitting period ON corresponding to the right eye image in the frame set. In an exemplary embodiment, the start point of the additional open period LO2 of the left eye shutter in the frame set may be temporally spaced apart from the end point of the neighboring primary open period LO1 of the left eye shutter in the frame set by a temporal distance greater than zero (0), and the end point of the additional open period LO2 of the left eye shutter in the frame set may be temporally spaced apart from the neighboring light emitting period ON by a fifth time t5. In such an embodiment, the fifth time t5 may be predetermined based on the response speed of the shutter (e.g., the speed for the shutter to completely close) such that the right eye image in the frame set is not shown through the left eye shutter. In an exemplary embodiment, where the response speed of the shutter member 60 is substantially fast, the fifth time t5 may be about zero (0), for example. In an exemplary embodiment, a substantial portion of the additional open period LO2 of the left eye shutter may overlap a period during which the backlight unit 900 is turned off, and the viewer may not see the image of the display panel 300 through the left eye shutter. In an alternative exemplary embodiment, the additional open period LO2 of the left eye shutter may overlap a portion of the light emitting period ON to display the left eye image in the frame set.

In an exemplary embodiment, an open period of the right eye shutter of the shutter member 60 in a frame set includes a primary open period RO1 and an additional open period RO2 neighboring thereto. In the primary open period RO1, the right eye shutter may be opened during at least a portion of the light emitting period ON of the backlight unit 900 corresponding to the right eye image in the frame set. A closed period of the right eye shutter may occur between the primary open period RO1 and the additional open period RO2 of the right eye shutter. In an exemplary embodiment, the open periods RO1 and RO2 of the right eye shutter may occur between two light emitting periods ON corresponding to left eye images in two neighboring frame sets, respectively.

In an exemplary embodiment, the primary open period RO1 of the right eye shutter in the frame set may begin a sixth time t6 before a start point of the corresponding light emitting period ON of the right eye image in the frame set. In an alternative exemplary embodiment, the primary open period RO1 of the right eye shutter may begin the sixth time t6' after the start point of the corresponding light emitting period ON of the right eye image in the frame set. In an exemplary embodiment, the primary open period RO1 of the right eye shutter may end a seventh time t7 after an end point of the corresponding light emitting period ON of the right eye image. In an alternative exemplary embodiment, the primary open period RO1 of the right eye shutter may end the seventh time t7' after the end point of the corresponding light emitting period ON of the right eye image. The sixth time t6 may have predetermined time duration such that a left eye image in a subsequent frame set is not shown while the image of the display panel 300 is shown through the right eye shutter with increased luminance. The primary open period RO1 of the right eye shutter may not overlap the light emitting period ON corresponding to the left eye image in the subsequent frame set. In an exemplary embodiment, the right eye image displayed during the corresponding light emitting period ON may be shown to the viewer through the right eye shutter that is opened during the primary open period RO1 of the right eye shutter. In such an embodiment, the left eye shutter may be closed during the primary open period RO1 of the right eye shutter.

The additional open period RO2 of the right eye shutter in the frame set may occur between the primary open period RO1 of the right eye shutter in a previous frame set and the light emitting period ON of the backlight unit 900 corresponding to the left eye image in the frame set. In such an embodiment, a temporal distance between a start point or an end point of the additional open period RO2 of the right eye shutter and a start point or an end point of a neighboring primary open period RO1 of the right eye shutter may be greater than zero (0). In an exemplary embodiment, a temporal distance between the end point of the additional open period RO2 and the light emitting period ON corresponding to the left eye image may be about an eighth time t8. In such an embodiment, the eighth time t8 is predetermined based on the response speed of the shutter, that is, the speed at which the shutter is completely closed, and the left eye image in the frame set is thereby not be shown through the right eye shutter. When the response speed of the shutter member 60 is substantially fast, the eighth time t8 may be about zero (0). In an exemplary embodiment, substantial portion of the additional open period RO2 of the right eye shutter may overlap a time period during which the backlight unit 900 is turned off, and the viewer may not recognize the image of the display panel 300 through the right eye shutter. In an alternative exemplary embodiment, the additional open period RO2 of the right eye shutter may overlap a portion of the light emitting period ON to display the right eye image.

The third time t3 or t3' and the sixth time t6 or t6' may be substantially the same as each other, the fourth time t4 or t4' and the seventh time t7 or t7' may be substantially the same as each other, and the fifth time t5 and the eighth time t8 may be substantially the same as each other.

The temporal width W1 of the primary open period LO1 of the left eye shutter, the temporal width W2 of the additional open period LO2 of the left eye shutter, the temporal width W3 of the primary open period RO1 of the right eye shutter and the temporal width W4 of the additional open period RO2 of the right eye shutter may be in a range from about 1 ms to about 6 ms.

In an exemplary embodiment, at least one additional open period of LO2 and RO2 is additionally disposed along with the primary open periods LO1 and RO1 to show the left eye image or the right eye image such that the operation frequency of the shutter member 60 may be increased by at least twice the operation frequency of an embodiment where only the primary open periods LO1 and RO1 are used. In an exemplary embodiment, on/off operation frequency of each of the left eye shutter and the right eye shutter is greater than the critical fusion frequency, and the flickering is thereby effectively prevented. According to an experiment, the critical fusion frequency may be about 75 hertz (Hz), and the flickering may not be recognized when the operation frequency of the shutter is greater than the critical fusion frequency. Accordingly, in an exemplary embodiment where the vertical blank period VB is maintained during one frame, when the image display frequency of the display panel assembly 1000 is about 240 Hz, the operation frequency of the left eye shutter or the right eye shutter of the shutter member 60 may be greater than or equal to about 120 Hz, which is greater than the critical fusion frequency, such that the flickering may not be recognized through the shutter. Here, the operation frequency of each shutter may be a number of all of the open periods included during a unit time of 1 second, and may include a case where the temporal interval between the open periods is not uniform.

In an exemplary embodiment, regardless of the temporal width of the vertical blank period VB, when the left eye image display frequency or the right eye image display frequency is about 60 Hz and one additional open period of LO2 and RO2 is included in each frame set, the operation frequency of the left eye shutter or the right eye shutter of the shutter member 60 may be about 120 Hz, which is twice the left eye image display frequency or the right eye image display frequency, and the flickering is thereby effectively prevented. In an exemplary embodiment, each display frequency of the right eye image or the left eye image is about 37.5 Hz, and the operation frequency of the right eye shutter or the left eye shutter may be greater than or equal to about 75 Hz of the critical fusion frequency. In such an embodiment, the image display frequency of the display panel assembly 1000 may be greater than or equal to about 150 Hz.

Next, alternative exemplary embodiment of a driving method of the 3D image display device shown in FIGS. 1 and 2 will be described with reference to FIGS. 4 to 7. The same or like elements shown in FIGS. 4 to 7 have been labeled with the same reference characters as used above to describe the exemplary embodiment of the driving method in FIG. 3, and any repetitive detailed description thereof will hereinafter be omitted or simplified.

FIGS. 4 to 7 are signal timing diagrams showing alternative exemplary embodiments of a driving method of a 3D image display device according to the invention.

Figure 4:
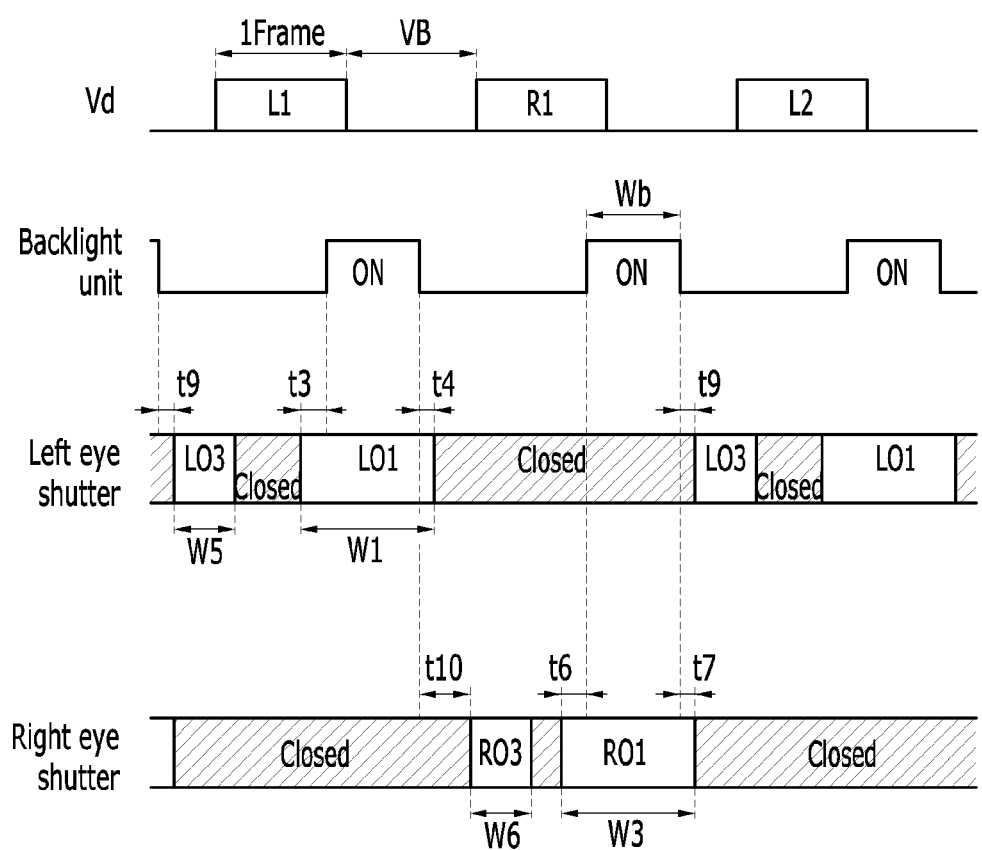

The driving method of the 3D image display device in FIG. 4 is substantially the same as the exemplary embodiment of the driving method shown in FIG. 3, except for the position of at least one additional open period of the left eye shutter and the right eye shutter.

In an exemplary embodiment, as shown in FIG. 4, the additional open period LO3 of the left eye shutter in a frame set may occur between the primary open period LO1 of the left eye shutter and a light emitting period ON corresponding to the right eye image in a previous frame set. In such an embodiment, the end point of the additional open period LO3 of the left eye shutter may be temporally spaced apart from the start point of the primary open period LO1 of the left eye shutter, and a temporal distance between the additional open period LO3 of the left eye shutter and the light emitting period may be a ninth time t9. In an exemplary embodiment, the ninth time t9 may be predetermined based on the response speed of the shutter such that the right eye image in the previous frame set is not shown by the left eye shutter. In an exemplary embodiment, where the response speed of the shutter member 60 is substantially fast, the ninth time t9 may be about zero (0).

In an exemplary embodiment, as shown in FIG. 4, the additional open period RO3 of the right eye shutter in a frame set may occur between the primary open period RO1 of the right eye shutter and the light emitting period ON corresponding to the left eye image in the frame set. In such an embodiment, an end point of the additional open period RO3 of the right eye shutter may be temporally spaced apart from the primary open period RO1 of the right eye shutter, and a temporal distance between the additional open period RO3 of the right eye shutter and the light emitting period ON corresponding to the left eye image in the frame set may be a tenth time t10. In an exemplary embodiment, the tenth time t10 may be predetermined based on the response speed of the shutter such that the left eye image in the frame set is not shown by the right eye shutter. In an exemplary embodiment, where the response speed of the shutter member 60 is substantially fast, the tenth time t10 may be about zero (0).

The temporal width W5 of the additional open period LO3 of the left eye shutter and the temporal width W6 of the additional open period RO3 of the right eye shutter may be in a range from about 1 ms to about 6 ms.

Figure 5:
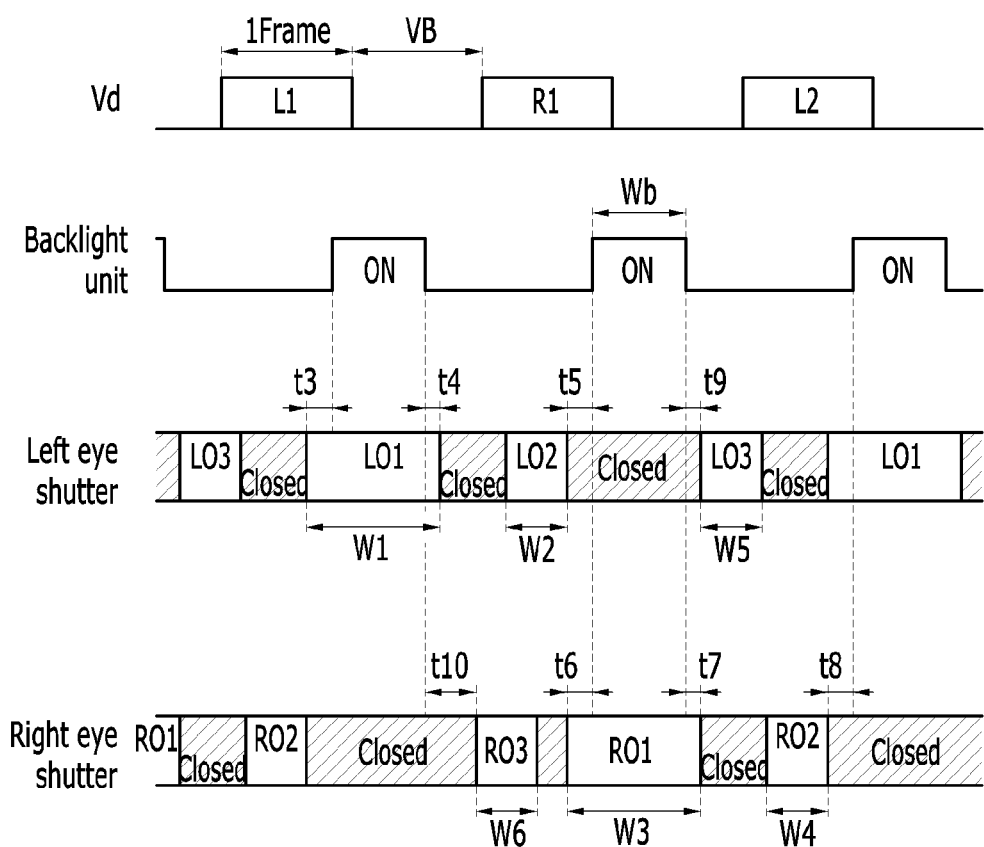

Next, another alternative exemplary embodiment of a driving method of the 3D image display device will be described referring to FIG. 5. The driving method in FIG. 5 is substantially the same as the exemplary embodiment shown in FIG. 3, except for at least two additional open periods, e.g., a first additional open period LO2 of the left eye shutter, a second additional open period LO3 of the left eye shutter, a first additional open period RO2 of the right eye shutter and a second additional open period RO3 of the right eye shutter, are included in a frame set. In an exemplary embodiment, as shown in FIG. 5, one of the two or more additional open periods of the left eye shutter, e.g., the first additional open period LO2 of the left eye shutter, may occur in a frame set between the light emitting period ON corresponding to the left eye image and the light emitting period ON corresponding to the right eye image in the frame set. In an exemplary embodiment, another of the two or more additional open periods of the left eye shutter, e.g., the second additional open period LO3 of the left eye shutter, may occur in the frame set between the light emitting period ON corresponding to the right eye image in the frame set and the light emitting periods ON corresponding to the left eye image in a subsequent frame set. The closed period of the left eye shutter occurs between of the two or more additional open periods, e.g., between the first and second additional open periods LO2 and LO3 of the left eye shutter or between the primary open period LO1 of the left eye shutter and the first and second additional open periods LO2 and LO3 of the left eye shutter. In an exemplary embodiment, one of the two or more additional open periods of the right eye shutter, e.g., the first additional open period RO2 of the right eye shutter, may occur in the frame set between the light emitting period ON corresponding to the right eye image in the frame set and the light emitting period ON corresponding to the left eye image in the frame set. In such an embodiment, another of the two or more additional open periods, e.g., the second additional open period RO2 of the right eye shutter, may occur in the frame set between the light emitting period ON corresponding to the left eye image in the frame set and the light emitting period ON corresponding to the right eye image in a previous frame set. The closed period of the right eye shutter occurs between of the two or more additional open periods of the right eye shutter, e.g., the first and second additional open periods RO2 and RO3 of the right eye shutter, or between the primary open period RO1 of the right eye shutter and the first and second additional open periods RO2 and RO3 of the right eye shutter.

Figure 6:
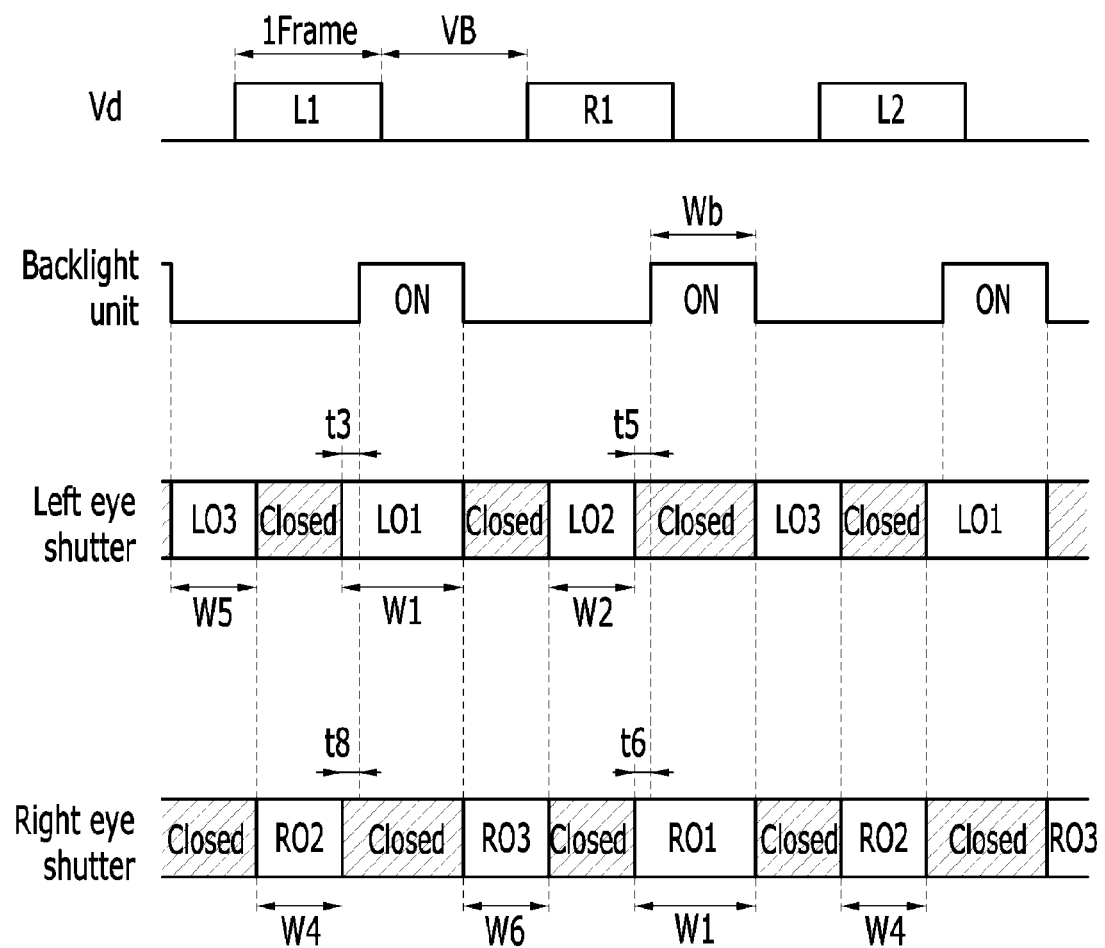

Next, another alternative exemplary embodiment of a driving method of the 3D image display device will be described referring to FIG. 6. The driving method shown in FIG. 6 is substantially the same as the exemplary embodiment shown in FIG. 5, except that the open period of the left eye shutter and the open period of the right eye shutter are not overlapping each other and are alternately arranged.

The start point of the primary open period LO1 of the left eye shutter is positioned in a frame set the third time t3 before the start point of the light emitting period ON of the backlight unit 900 corresponding to the left eye image in the frame set, and the end point is substantially identical to the end point of the light emitting period ON corresponding to the left eye image. In an exemplary embodiment, the start point of the primary open period RO1 of the right eye shutter is positioned in the frame set the sixth time t6 before the start point of the light emitting period ON of the backlight unit 900 corresponding to the right eye image in the frame set, and the end point may be substantially identical to the end point of the light emitting period ON corresponding to the right eye image in the frame set. In an exemplary embodiment, at least one of the third time t3 and the sixth time t6 may be about zero (0).

The end point of the first additional open period LO2 of the left eye shutter may be positioned in a frame set the fifth time t5 before the start point of the light emitting period ON corresponding to the right eye image in the frame set, and the end point of the first additional open period RO2 of the right eye shutter may be positioned in the frame set the eighth time t8 before the start point of the light emitting period ON corresponding to the left eye image display in the frame set. The fifth time t5 may be substantially the same as the third time t3, and the eighth time t8 may be substantially the same as the fifth time t5. In an exemplary embodiment, another additional open period may occur between the primary open period LO1 and RO1 and the additional open period LO2 and RO2.

In an exemplary embodiment, the start point of the second additional open period LO3 of the left eye shutter may be substantially identical to the end point of the light emitting period ON corresponding to the right eye image in a previous frame set. In an exemplary embodiment, the start point of the second additional open period RO3 of the right eye shutter may be substantially identical to the end point of the light emitting period ON corresponding to the left eye image display in the frame.

At least two of the temporal widths W1, W2, W3, W4, W5 and W6 of all of the primary and additional open periods LO1, LO2, LO3, RO1, RO2 and RO3 may be substantially the same. The temporal widths W1, W2, W3, W4, W5 and W6 of all of the primary and additional open periods LO1, LO2, LO3, RO1, RO2 and RO3 may be in a range from about 1 ms to about 5 ms.

Figure 7:
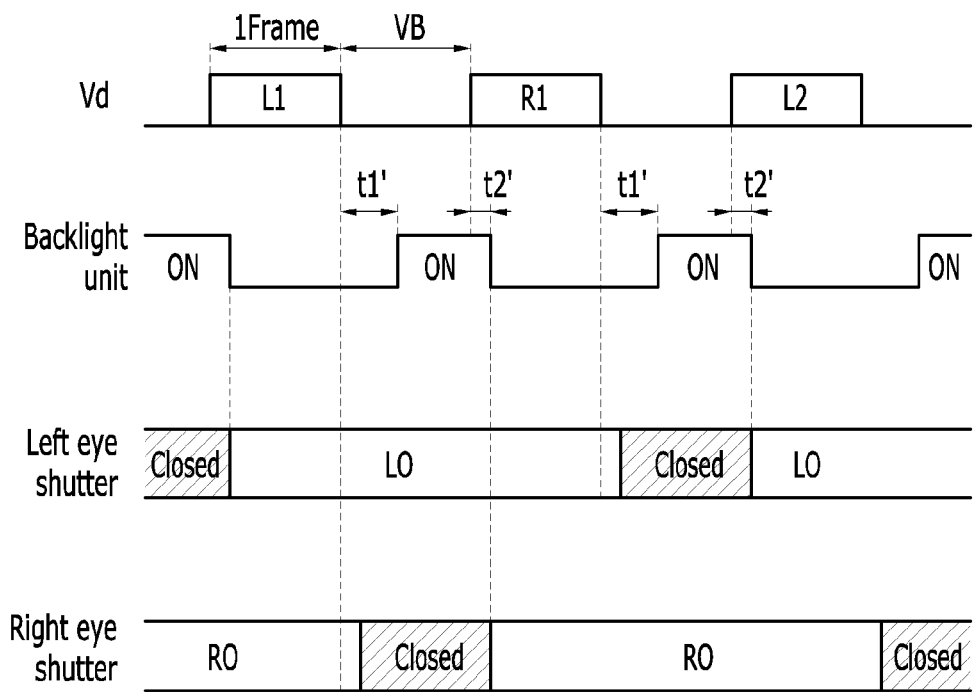

Next, another alternative exemplary embodiment of a driving method of the 3D image display device will be described referring to FIG. 7. The driving method shown in FIG. 7 is substantially the same as the most of the exemplary embodiment shown in FIG. 3, except that the first additional open period LO2 and RO2 is not be included.

The light emitting period ON of the backlight unit 900 may begin in a vertical blank period VB of a frame set the first time t1' after the end point of the input period of the data voltage L1, L2 and R1 of a previous frame, and may end the second time t2' after the start point of the input period of the data voltages L1, L2 and R1 of a subsequent frame.

The start point of the open period LO of the left eye shutter in a frame set may be substantially identical to the finish point of the light emitting period ON corresponding to the right eye image in a previous frame set, and the open period LO of the left eye shutter may end a predetermined time before the start point of the light emitting period ON corresponding to the right eye image in the frame set. The open period RO of the right eye shutter in a frame set may begin substantially simultaneously with the finish point of the light emitting period ON corresponding to the left eye image display in the frame set, and may end a predetermined time before the start point of the light emitting period ON corresponding to the left eye image in a subsequent frame set. According to an exemplary embodiment, as shown in FIG. 7, the left eye image display frequency and the operation frequency of the left eye shutter may be substantially the same, and the right eye image display frequency and the operation frequency of the right eye shutter may be substantially the same.

In such an embodiment, the operation frequency of the shutter may be greater than the critical fusion frequency such that the flickering of the image is effectively prevented. In one exemplary embodiment, for example, where the critical fusion frequency is about 75 Hz, the flickering may be effectively prevented when the left eye image display frequency or the right eye image display frequency is about 75 Hz. In such an embodiment, the display frequency of all images including the vertical blank period VB of one frame may be greater than or equal to about 300 Hz, which is four times about 75 Hz.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three-dimensional image display device comprising:
  a display panel assembly including a display panel, wherein the display panel comprises:
    a plurality of pixels which alternately displays a first image and a second image; and
    a data driver which transmits data voltages to the plurality of pixels;
  a backlight unit which provides light to the display panel assembly; and
  a shutter member including a first shutter and a second shutter,
  wherein the backlight unit emits the light during a plurality of light emitting periods,
  wherein the plurality of light emitting periods includes a plurality of first light emitting periods, during which the first image is displayed, and a plurality of second light emitting periods, during which the second image is displayed,
  wherein the plurality of first light emitting periods and the plurality of second light emitting periods alternate,
  the first shutter is opened during at least two open periods, which are between neighboring second light emitting periods of the plurality of second light emitting periods and temporally spaced apart from each other,
  the second shutter is opened during at least two open periods, which are between neighboring first light emitting periods of the plurality of first light emitting periods and temporally spaced apart from each other,
  the at least two open periods of the first shutter and the at least two open periods of the second shutter do not overlap each other, and
  the open periods of the first shutter and the open periods of the second shutter are alternately arranged.

2. The three-dimensional image display device of claim 1, wherein
  the at least two open periods of the first shutter include:
    a primary open period overlapping at least a portion of one of the plurality of first light emitting periods, which is between the neighboring second light emitting periods; and
    a first additional open period between one of the plurality of first light emitting periods and one of the plurality of second light emitting periods, which are neighboring each other.

3. The three-dimensional image display device of claim 2, wherein
  the data voltage includes a first data voltage for the first image and a second data voltage for the second image,
  a vertical blank period is between an input period of the first data voltage and an input period of the second data voltage, and
  the vertical blank period overlaps at least one of the plurality of light emitting periods.

4. The three-dimensional image display device of claim 3, wherein
  the second shutter is closed during the plurality of first light emitting periods, and
  the first shutter is closed during the plurality of second light emitting periods.

5. The three-dimensional image display device of claim 1, wherein
  the data voltage includes a first data voltage for the first image and a second data voltage for the second image,
  a vertical blank period is between an input period of the first data voltage and an input period of the second data voltage, and
  the vertical blank period overlaps at least one of the plurality of light emitting periods.

6. The three-dimensional image display device of claim 5, wherein
  the second shutter is closed during the plurality of first light emitting periods, and
  the first shutter is closed during the plurality of second light emitting periods.

7. The three dimensional image display device of claim 1, wherein
  an operation frequency of at least one of the first shutter and the second shutter is greater than or equal to about 75 hertz.

8. A method for driving a three-dimensional image display device including a display panel assembly including a display panel including a plurality of pixels which alternately displays a first image and a second image and a data driver which transmits data voltages to the plurality of pixels, a backlight unit which provides light to the display panel assembly, and a shutter member including a first shutter and a second shutter, the method comprising:
  applying a first data voltage for the first image to the plurality of pixels;
  applying a second data voltage for the second image to the plurality of pixels;
  emitting the light during a plurality of first light emitting periods, during which the first image is displayed, from the backlight unit;
  emitting the light during a plurality of second light emitting periods, during which the second image is displayed, from the backlight unit;

opening the first shutter during at least two open periods, which are between neighboring second light emitting periods of the plurality of second light emitting periods and temporally spaced apart from each other, and opening the second shutter during at least two open periods, which are between neighboring first light emitting periods of the plurality of first light emitting periods and temporally spaced apart from each other, wherein the plurality of first light emitting periods and the plurality of second light emitting periods alternate, the at least two open periods of the first shutter and the at least two open periods of the second shutter do not overlap each other, and the open periods of the first shutter and the open periods of the second shutter are alternately arranged.

9. The method of claim 8, wherein
the at least two open periods of the first shutter include:
a primary open period overlapping at least a portion of one of the plurality of first light emitting periods, which is between the neighboring second light emitting periods; and
a first additional open period between one of the plurality of first light emitting periods and one of the plurality of second light emitting periods, which are neighboring each other.

10. The method of claim 9, wherein
a vertical blank period is between an input period of the first data voltage and an input period of the second data voltage, and
the vertical blank period overlaps at least one of plurality of first light emitting periods and the plurality of second light emitting periods.

11. The method of claim 10, further comprising:
closing the second shutter during the plurality of first light emitting period, and
closing the first shutter during the plurality of second light emitting period.

12. The method of claim 8, wherein
a vertical blank period is between an input period of the first data voltage and an input period of the second data voltage, and
the vertical blank period overlaps at least one of plurality of first light emitting periods and the plurality of second light emitting periods.

13. The method of claim 8, wherein
an operation frequency of at least one of the first shutter and the second shutter is greater than or equal to about 75 hertz.

* * * * *